US012578925B2

(12) United States Patent
Schelm et al.

(10) Patent No.: US 12,578,925 B2
(45) Date of Patent: Mar. 17, 2026

(54) DYNAMIC ALGORITHM SELECTION

(71) Applicant: International Business Machines Corporation, Armonk, NY (US)

(72) Inventors: Kerstin Claudia Schelm, Stuttgart (DE); Cedric Lichtenau, Stuttgart (DE); Michael Klein, Schoenaich (DE); Stefan Payer, Stuttgart (DE); Petra Leber, Ehningen (DE)

(73) Assignee: International Business Machines Corporation, Armonk, NY (US)

( * ) Notice: Subject to any disclaimer, the term of this patent is extended or adjusted under 35 U.S.C. 154(b) by 1058 days.

(21) Appl. No.: 17/680,436

(22) Filed: Feb. 25, 2022

(65) Prior Publication Data

US 2023/0273769 A1     Aug. 31, 2023

(51) Int. Cl.
*G06F 7/535* (2006.01)
*G06F 7/491* (2006.01)
*G06F 7/52* (2006.01)

(52) U.S. Cl.
CPC ............ *G06F 7/535* (2013.01); *G06F 7/4915* (2013.01); *G06F 7/52* (2013.01)

(58) Field of Classification Search
CPC ........... G06F 7/487–4876; G06F 7/491; G06F 7/4915–4917; G06F 7/52–523; G06F 7/533; G06F 7/535–5375; G06F 7/5443; G06F 7/72–721; G06F 2207/4911; G06F 2207/5352–5353
See application file for complete search history.

(56) References Cited

U.S. PATENT DOCUMENTS

| | | | |
|---|---|---|---|
| 7,912,890 B2 * | 3/2011 | Cornea-Hasegan | G06F 7/4915 |
| | | | 708/503 |
| 2004/0230634 A1 | 11/2004 | Busaba | |
| 2006/0064454 A1 | 3/2006 | Wang | |
| 2006/0259530 A1 * | 11/2006 | Busaba | G06F 9/3001 |
| | | | 712/E9.017 |

(Continued)

FOREIGN PATENT DOCUMENTS

| | | |
|---|---|---|
| CN | 107992295 B | 1/2021 |
| CN | 116661747 A | 8/2023 |
| JP | 2023-124837 A | 9/2023 |

OTHER PUBLICATIONS

David Kirk and Wen-mei W. Hwu, "Lecture 10 Reduction Trees", Lecture Notes from University of Illinois and University of California Riverside, 2012, retrieved from https://www.cs.ucr.edu/~nael/217-f15/lectures/217-lec10.pdf (Year: 2012).*

(Continued)

*Primary Examiner* — Matthew D Sandifer
(74) *Attorney, Agent, or Firm* — David K. Mattheis

(57) ABSTRACT

Dynamic selection of a multiplication algorithm by receiving operands A and B, determining a difference between A and B, selecting a first multiplication algorithm if the difference falls below a threshold, selecting a second multiplication algorithm if the difference equals or exceeds the threshold, pre-scaling the operands, calculating a quotient for the scaled operands, back multiplying the quotient using the selected algorithm, yielding a product, subtracting the product from operand A, yielding a remainder, and providing the remainder as an output.

18 Claims, 4 Drawing Sheets

(56) References Cited

U.S. PATENT DOCUMENTS

| | | | |
|---|---|---|---|
| 2008/0275931 A1 | 11/2008 | Schmookler | |
| 2009/0132629 A1* | 5/2009 | Carlough | G06F 7/496 |
| | | | 708/623 |
| 2009/0164546 A1* | 6/2009 | Gopal | G06F 7/72 |
| | | | 708/620 |
| 2018/0095728 A1 | 4/2018 | Hasenplaugh | |
| 2019/0212983 A1 | 7/2019 | Carlough | |

OTHER PUBLICATIONS

Alex Dillhoff, "GPU Pattern: Reduction", 2024, retrieved from https://ajdillhoff.github.io/notes/gpu_pattern_reduction (Year: 2021).*
David Rouse, "Chapter VI: Reduction Trees", from A Practical Introduction To Formal Logic, 2004, retrieved from https://web.archive.org/web/20060921115226/https://people.uvawise.edu/philosophy/Logic%20Text/Chapter%206%20Reduction%20Trees.pdf (Year: 2004).*
Stefan Wewers, "Reduction trees: a data structure for semistable reduction of covers of the projective line", 2017, retrieved from https://mclf.readthedocs.io/en/latest/reduction_trees.html (Year: 2017).*
"Hybrid Cloud mit AWS", Aws, @ 2022, Amazon Web Services, Inc. oder Tochterfirmen. Alle Rechte vorbehalten, 15 pps., <https://aws.amazon.com/de/hybrid/>.
"IBM Cobol for Linux on x86 features", IBM, 9 pps., downloaded from the Internet on Feb. 13, 22, <https://www.ibm.com/products/cobol-compiler-linux-x86/details>.
"Statistic Brain Research Institute", Copyright © 2022 Statistic Brain, 5 pps., <https://www.statisticbrain.com/gppgle-searches>.
De Valence, "Migrating a Mainframe to AWS in 5 Steps with Astadia", Mar. 23, 2018, AWS Partner Network (APN) Blog, in AWS Partner Network, Mainframe & Legacy, Migration & Transfer Services | Permalink, 6 pps., <https://aws.amazon.com/blogs/apn/migrating-a-mainframe-to-aws-in-5-steps/?>.
Mell et al., "The NIST Definition of Cloud Computing", National Institute of Standards and Technology, U.S. Department of Commerce, NIST Special Publication 800-145, Sep. 2011, 7 pages.
Steuart et al., "AWS Partner Network (APN) Blog Coming Soon: The AWS Mainframe Migration Competency", Dec. 3, 2020, in Announcements, AWS Partner Network, AWS re: Invent, Customer Solutions, Foundational (100), Mainframe & Legacy, Mainframe Migration, Migration | Permalink, 4 pps., <https://aws.amazon.com/blogs/apn/coming-soon-the-aws-mainframe-migration-competency/>.
Wang et al., "Decimal floating-point division using Newton-Raphson iteration", Proceedings of the 15th IEEE International Conference on Application-Specific Systems, Architectures and Processors (ASAP'04), IEEE, 12 pps., <https://ieeexplore.ieee.org/document/1342461>.

* cited by examiner

200

DYNAMIC ALGORITHM SELECTION

FIELD OF THE INVENTION

The disclosure relates generally to the dynamic selection of processor algorithms. The disclosure relates particularly to the dynamic selection of processor multiplication algorithms according to input data.

BACKGROUND

Common Business Oriented Language (COBOL) is a computer programming language having a vast established base of legacy programs in use around the world. Many customer information control system (CICS®) transaction are supported through COBOL code. Millions of CICS transaction are processed each second of the day. COBOL supports a wide range of arithmetic functions for decimal number operations, including the vector remainder decimal function VRP, which receives inputs (A, B) and calculates a quotient and remainder such that A=quotient *B with a remainder, the absolute value of the remainder<the absolute value of B, the sign of the remainder is the sign of A. The VRP function outputs the remainder. (Note: the term(s) "CICS" may be subject to trademark rights in various jurisdictions throughout the world and are used here only in reference to the products or services properly denominated by the marks to the extent that such trademark rights may exist.)

The calculation of the remainder is split into a division part where the quotient is calculated and a remainder part where the quotient is multiplied by the divisor and the result is subtracted from the dividend. Depending upon the value of the quotient, the algorithm utilized in multiplying the quotient by the divisor may require more or fewer computing cycles to complete. As millions of operations occur per second, selecting the more efficient multiplication algorithm for each such operation yield benefits in terms of millions of fewer computing cycles utilized in completing the processing of the VRP functions.

SUMMARY

The following presents a summary to provide a basic understanding of one or more embodiments of the disclosure. This summary is not intended to identify key or critical elements or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatuses and/or computer program products enable dynamic selection of a multiplication algorithm according to input values.

Aspects of the invention disclose methods, systems and computer readable media associated with dynamic selection of a multiplication algorithm by receiving operands A and B, determining a difference between A and B, selecting a first multiplication algorithm if the difference falls below a threshold, selecting a second multiplication algorithm if the difference equals or exceeds the threshold, pre-scaling the operands, calculating a quotient for the scaled operands, back multiplying the quotient using the selected algorithm, yielding a product, subtracting the product from operand A, yielding a remainder, and providing the remainder as an output.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
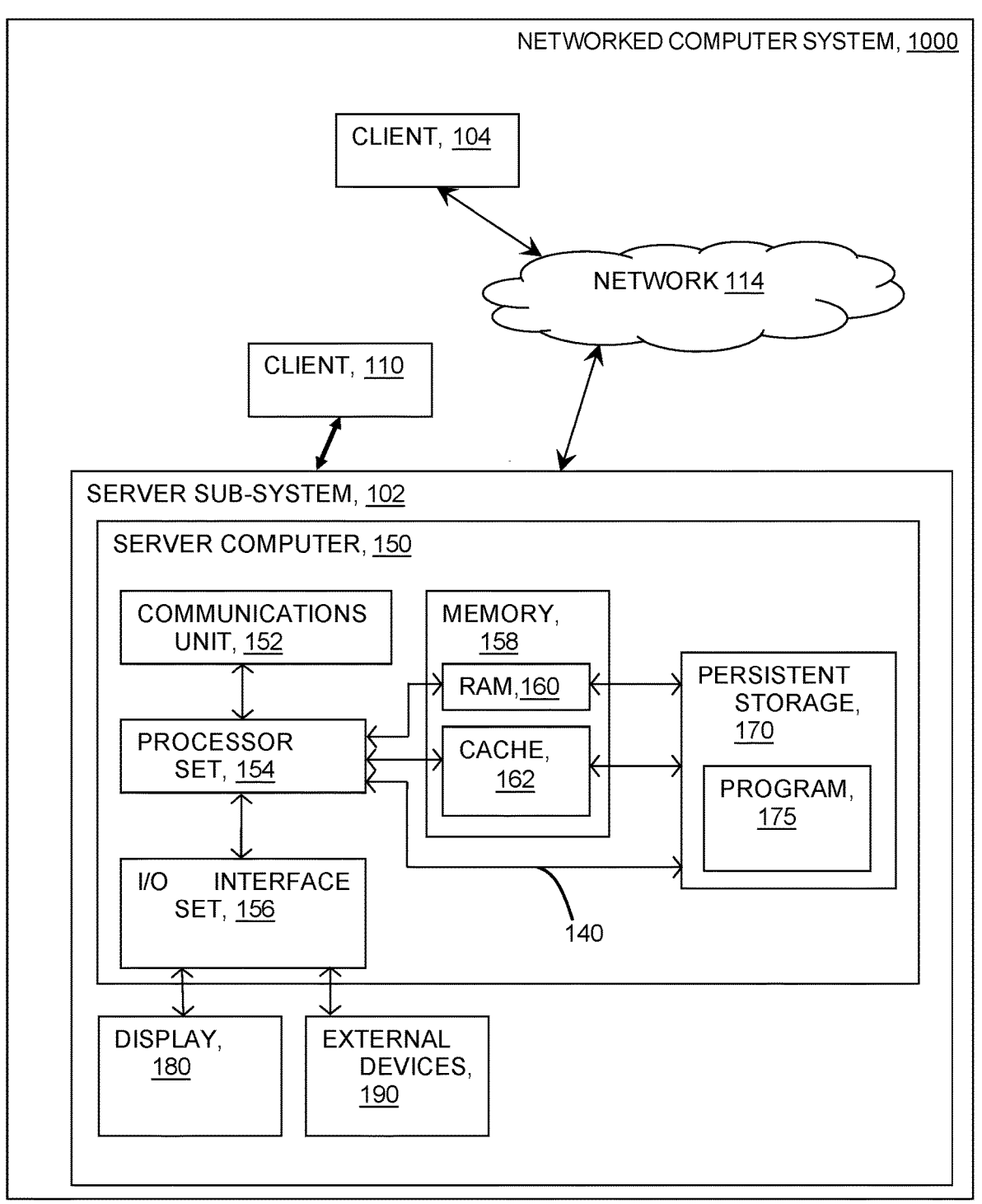
FIG. 1 provides a schematic illustration of a computing environment, according to an embodiment of the invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

Calculation of a remainder output for a function such as VRP (A, B), includes a division calculation, wherein a quotient of A divided by B is determined, and a remainder part where the quotient*B is subtracted from A, leaving the remainder, as the final output. The selection of the algorithms used for the quotient calculation and for the algorithm used for the back multiplication part are based on data type, area requirements, cycle time requirements, performance, etc. For a decimal divide, operand prescaling followed by a digit wise loop over 4 cycles yields the quotient. For the multiplication, the system may have a choice, either digit wise multiplication and continuous summing of the partial products, or multi-digit multiplication in combination with a decimal reduction tree. Each algorithm has advantages and disadvantages, depending upon the operands. For instances where at least one operand is short, the digit wise multiplication requires fewer computing cycles to complete. For longer operands, the multi-digit multiplication takes fewer computing cycles.

In an embodiment, the method determines the relative size of the operands and makes an algorithm selection according to the relative operand size. In an embodiment, the method selects digit wise multiplication for operands having a number of quotient digits estimation based upon leading-zero difference of less than four and selecting multi-digit multiplication for those operands having a number of quotient digits estimation based upon leading zero difference of four or more. In this embodiment, the method determines as an estimation of the number of digits of the quotient according to the leading zero of the inputs, by the formula: #quotient digits=(leading_zero_digits B−leading_zero_digits A, leading_zero_digits B−leading_zero_digits A+1).

Aspects of the present invention relate generally to improving processing efficiency through the dynamic selection of a multiplication algorithm according to input values. In embodiments, computing system receives a computation (division) request, scales the operands for efficiency, estimates the number of digits in the quotient while concurrently determining the quotient, selects a back-multiplication algorithm according to the number of estimated quotient digits, back multiplies the quotient using the selected algorithm, and subtracts the product of the back multiplication from the dividend to determine the remainder as the final output. Selection of the algorithm according to a defined threshold for the estimated number of quotient digits enables the computing system to more efficiently process the division operation and saves computing cycles.

In accordance with aspects of the invention there is a method for dynamically selecting the appropriate back multiplication algorithm for a division computations. The method estimates the number of digits in a quotient and selects an algorithm based upon the relationship of the estimated number of quotient digits to a defined threshold of four estimated quotient digits. A first algorithm, digit wise multiplication with continuous summing of the partial products is selected for quotient digit estimations less than four, while a multi-digit multiplication in combination with a decimal reduction tree is selected for quotient digit estimations of four or more digits. As the number of quotient digits deviates further from four, the number of computing cycles saved through the dynamic algorithm selection method increases.

Aspects of the invention provide an improvement in the technical field of central processor computing instruction execution. For quotients having three digits, the method saves about three computing cycles by selecting digit wise multiplication, for five-digit quotients, the method saves one cycle by selecting the multi-digit multiplication. Greater cycle savings are achieved for quotients having more digits. Reduced cycles saves processing time and the energy necessary to complete the processing, resulting in more efficient overall computing operation.

Aspects of the invention also provide an improvement to computer functionality. In particular, implementations of the invention are directed to a specific improvement to the way processor compute division calculations. Disclosed method reduce the number of cycles necessary for such calculations resulting in time and energy savings for the operators of such systems.

In an embodiment, one or more components of the system can employ hardware and/or software to solve problems that are highly technical in nature (e.g., receiving operands, scaling the operands, calculating the quotient of the operands, estimating the number of digits in the quotient, selecting a back multiplication algorithm according to the quotient digit estimation, back multiplying the quotient using the selected algorithm, determining the remainder output by subtracting the product of the back multiplication from the dividend, etc.). These solutions are not abstract and cannot be performed as a set of mental acts by a human due to the processing capabilities needed to facilitate dynamic algorithm selection, for example. Further, some of the processes performed may be performed by a specialized computer for carrying out defined tasks related to mathematical computation. For example, a specialized computer can be employed to carry out tasks related to mathematical computations including dynamic algorithm selection, or the like.

In an embodiment, disclosed methods relate to the processing of instructions by a computing system including one or more processors. As part of the normal operations of the computing system, two operands (A, B) are passed to the processor for a division/remainder computation such as VRP, which provides as its output, the remainder of the operation A/B. Initially, the processor normalizes the two input operands, performs padding of the operands with trailing zero digits to fill the format and performs a scaling operation on the divisor B. The pre-scaling of the operands for the division calculation requires around eighteen cycles for completion. Following scaling, the method determines the quotient A/B, requiring a number of cycles which varies according to the number of digits in the quotient. In this embodiment, as the method performs the division operation, the method concurrently estimates the number of digits in the quotient. In an embodiment, the method estimates the number of digits in the quotient as the difference between the number of leading zeros in input B and the number of lead zeros in input A as well as the difference between the number of leading zeros in input B and the number of leading zeros in input A, plus 1, prior to normalization of the inputs. The estimation of the number of quotient digits occurs during the same cycles utilized to calculate the actual quotient A/B, therefore no latency is added to the overall calculation through the addition of the estimation and subsequent algorithm selection.

In an embodiment, the number of quotient digits relates to the number of cycles necessary for differing multiplication algorithms to calculate the product of quotient and B, for the purpose of determining the remainder as A minus that product. For the two algorithms, digit wise multiplication with continuous summing of partial products, and multi-digit multiplication with a decimal reduction tree, the number of necessary cycles for the back multiplication is roughly equal for four-digit quotients, while less than four digits favors the digit wise multiplication and more than four digits favors the multi-digit multiplication algorithm.

Following the calculation of the quotient and the concurrent estimation of quotient digits with the accompanying selection of a multiplication algorithm, the method applies the selected multiplication algorithm to the operand B and quotient to yield the product quotient * B. This operation requires differing computing cycles depending upon the number of digits in the quotient and the multiplication algorithm selected for use.

Following determining of the product, the method subtracts the product from operand to determine the remainder which is provided as the output of the function. The calculation of the remainder requires the same number of cycles regardless of the selected multiplication algorithm.

For the overall system, efficiency gains are achieved by selection of the more efficient multiplication algorithm for each iteration of the remainder function by the system. With each such selection, the system saves computing cycles.

FIG. 1 provides a schematic illustration of exemplary network resources associated with practicing the disclosed inventions. The inventions may be practiced in the processors of any of the disclosed elements which process an instruction stream. As shown in the figure, a networked Client device 110 connects wirelessly to server sub-system 102. Client device 104 connects wirelessly to server subsystem 102 via network 114. Client devices 104 and 110 comprise timeseries data set selection program (not shown) together with sufficient computing resource (processor, memory, network communications hardware) to execute the algorithm selection program. As shown in FIG. 1, server sub-system 102 comprises a server computer 150. FIG. 1 depicts a block diagram of components of server computer 150 within a networked computer system 1000, in accordance with an embodiment of the present invention. It should be appreciated that FIG. 1 provides only an illustration of one implementation and does not imply any limitations with regard to the environments in which different embodiments can be implemented. Many modifications to the depicted environment can be made.

Server computer 150 can include processor(s) 154, memory 158, persistent storage 170, communications unit 152, input/output (I/O) interface(s) 156 and communications fabric 140. Communications fabric 140 provides communications between cache 162, memory 158, persistent storage 170, communications unit 152, and input/output (I/O) interface(s) 156. Communications fabric 140 can be implemented with any architecture designed for passing data and/or control information between processors (such as microprocessors, communications and network processors, etc.), system memory, peripheral devices, and any other hardware components within a system. For example, communications fabric 140 can be implemented with one or more buses.

Memory 158 and persistent storage 170 are computer readable storage media. In this embodiment, memory 158 includes random access memory (RAM) 160. In general, memory 158 can include any suitable volatile or non-volatile computer readable storage media. Cache 162 is a fast memory that enhances the performance of processor(s) 154 by holding recently accessed data, and data near recently accessed data, from memory 158.

Program instructions and data used to practice embodiments of the present invention, e.g., the multiplication algorithm selection program 175, are stored in persistent storage 170 for execution and/or access by one or more of the respective processor(s) 154 of server computer 150 via cache 162. In this embodiment, persistent storage 170 includes a magnetic hard disk drive. Alternatively, or in addition to a magnetic hard disk drive, persistent storage 170 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 170 may also be removable. For example, a removable hard drive may be used for persistent storage 170. Other examples include optical and magnetic disks, thumb drives, and smart cards that are inserted into a drive for transfer onto another computer readable storage medium that is also part of persistent storage 170.

Communications unit 152, in these examples, provides for communications with other data processing systems or devices, including resources of client computing devices 104, and 110. In these examples, communications unit 152 includes one or more network interface cards. Communications unit 152 may provide communications through the use of either or both physical and wireless communications links. Software distribution programs, and other programs and data used for implementation of the present invention, may be downloaded to persistent storage 170 of server computer 150 through communications unit 152.

I/O interface(s) 156 allows for input and output of data with other devices that may be connected to server computer 150. For example, I/O interface(s) 156 may provide a connection to external device(s) 190 such as a keyboard, a keypad, a touch screen, a microphone, a digital camera, and/or some other suitable input device. External device(s) 190 can also include portable computer readable storage media such as, for example, thumb drives, portable optical or magnetic disks, and memory cards. Software and data used to practice embodiments of the present invention, e.g., multiplication algorithm selection program 175 on server computer 150, can be stored on such portable computer readable storage media and can be loaded onto persistent storage 170 via I/O interface(s) 156. I/O interface(s) 156 also connect to a display 180.

Display 180 provides a mechanism to display data to a user and may be, for example, a computer monitor. Display 180 can also function as a touch screen, such as a display of a tablet computer.

Figure 2:
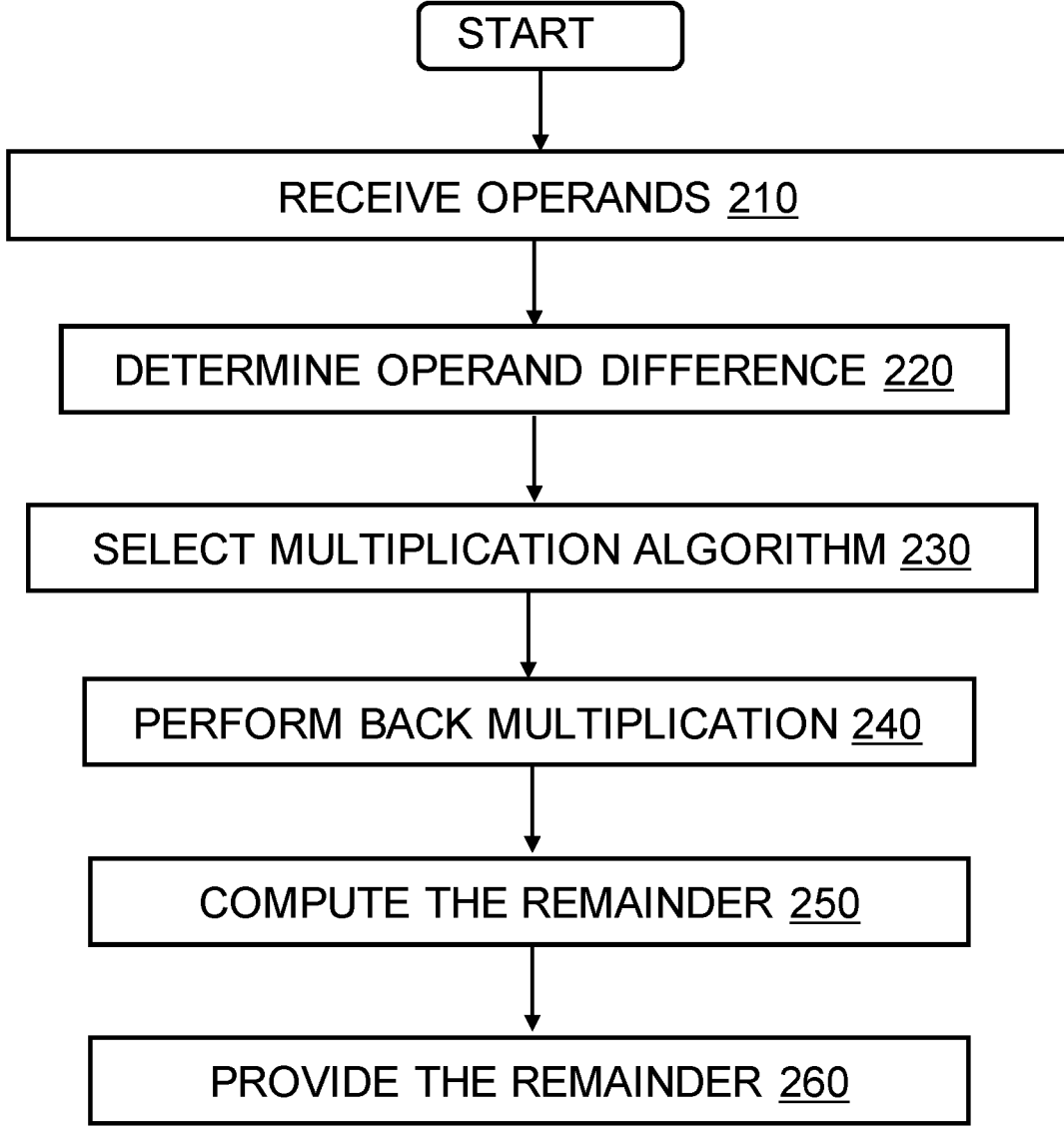
FIG. 2 provides a flowchart depicting an operational sequence, according to an embodiment of the invention.

FIG. 2 provides a flowchart 200, illustrating exemplary activities associated with the practice of the disclosure. After program start, at block 210, the method receives two operands (A, B) for processing as part of a mathematical operation such as VRP, for the computation and return of the remainder of the operation A/B. The operands may be passed as normal function of any underlying application program.

At block 220, the method determines a difference between the operands in support of estimating the number of digits in the quotient A/B. In an embodiment, the number of leading zero digits of each operand is determined and the difference of the number of leading_zero_digits is calculated. The method then concurrently calculates the quotient A/B and the quotient digit estimation: #quotient digits=(leading_zero_digits B–leading_zero_digits A, leading_zero_digits B–leading_zero_digits A+1).

At block 230, the method utilizes the value of #quotient digits to select among different multiplication algorithms for the back multiply step of the determination of the remainder portion of A/B. In this step, the method compares the value of #quotient digits to a threshold, such as four and selects a multiplication algorithm according to that comparison. In an embodiment, the method selects digit wise multiplication with continuous summing of partial products for #quotient digits results less than four and selects multi-digit multiplication with a decimal reduction tree, for #quotient digit estimation values equal to, or greater than four.

At block 240, the method applies the selected multiplication algorithm in performing the back multiplication of quotient * B, yielding a product P. At block 250, the method computes the difference A–P, yielding the remainder R, which is provided, at block 260, as the output of the function such as VRP.

In an embodiment, all processing of the disclosed function may occur as part of a single processor computing environment, or the processing my occur in the operations of a system of networked processors including a system for networked processor incorporating cloud infrastructure processors and other resources.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations).

It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3:
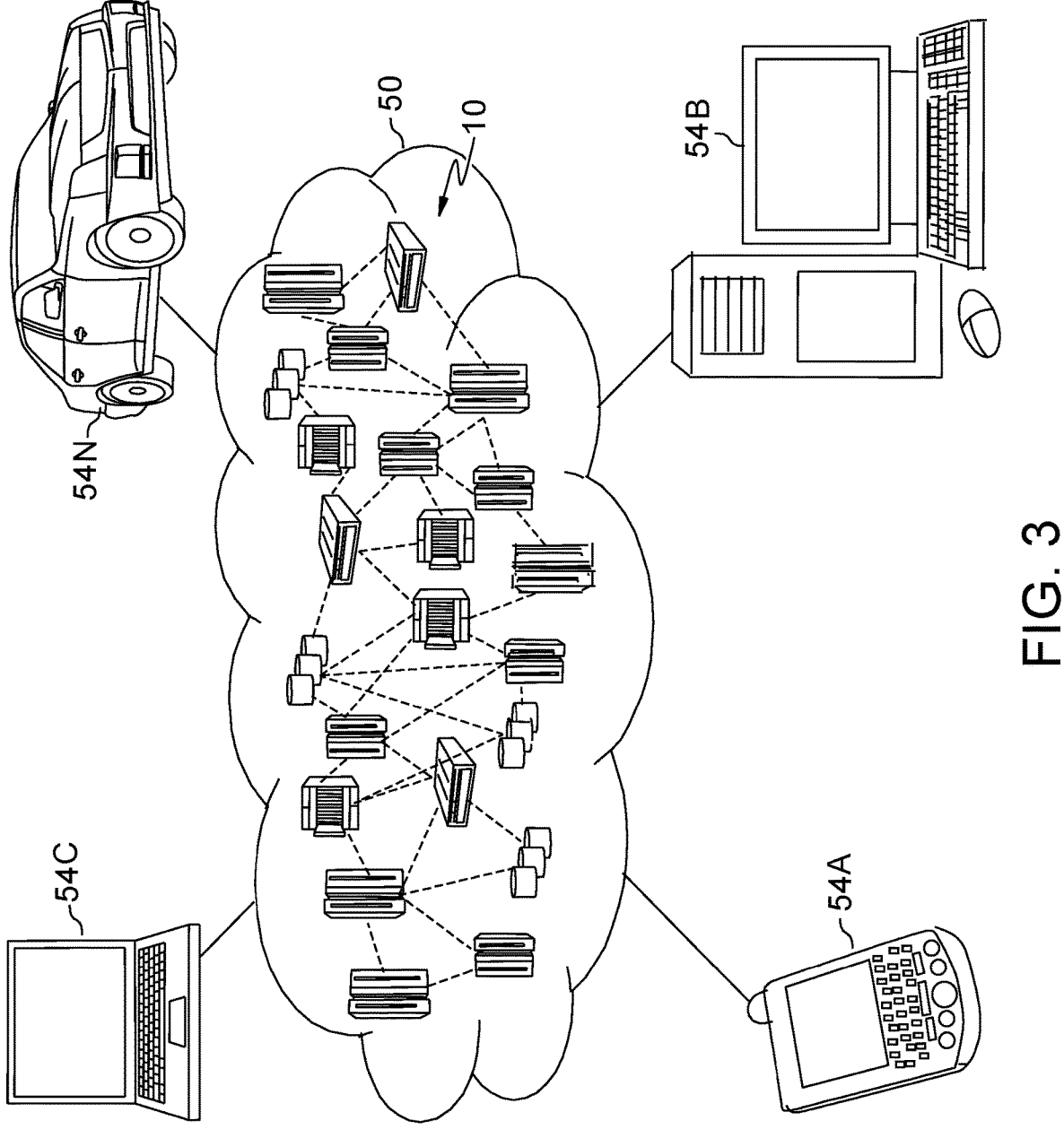
FIG. 3 depicts a cloud computing environment, according to an embodiment of the invention.

Referring now to FIG. 3, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 3 are intended to be illustrative only and that computing nodes 10 and cloud computing environment 50 can communicate with any type of computerized device over any type of network and/or network addressable connection (e.g., using a web browser).

Figure 4:
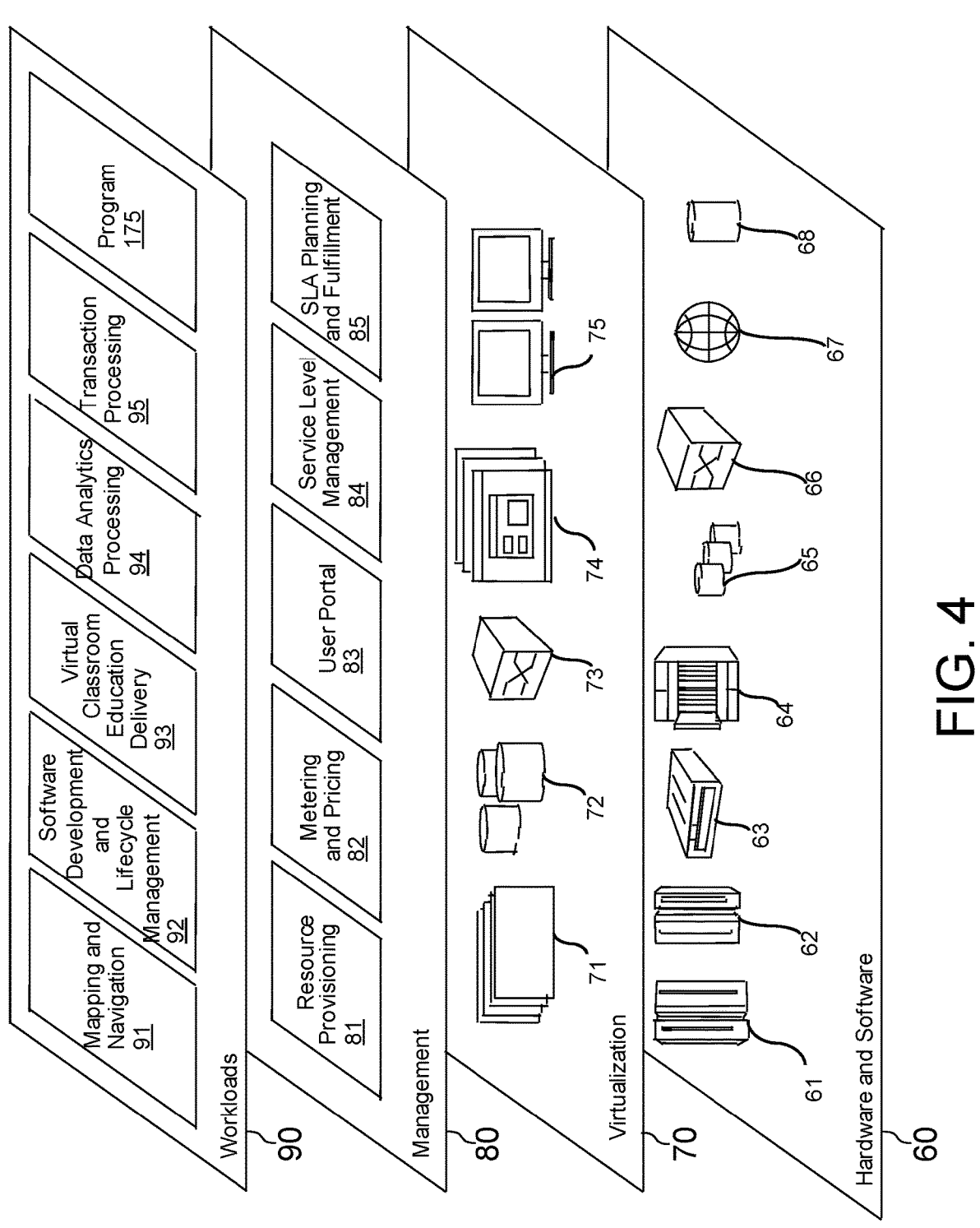
FIG. 4 depicts abstraction model layers, according to an embodiment of the invention.

Referring now to FIG. 4, a set of functional abstraction layers provided by cloud computing environment 50 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and multiplication algorithm selection program 175.

The present invention may be a system, a method, and/or a computer program product at any possible technical detail level of integration. The invention may be beneficially practiced in any system, single or parallel, which processes an instruction stream. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, or computer readable storage device, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions collectively stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer implemented method for dynamic selection of a multiplication algorithm comprising:

receiving, by one or more computer processors, operands A and B;

determining, by the one or more computer processors, a difference between A and B;

selecting, by the one or more computer processors, a digit wise multiplication algorithm if the difference falls below a threshold;

selecting, by the one or more computer processors, a multi-digit multiplication algorithm if the difference equals or exceeds the threshold;

determining a product, by the one or more computer processors using the selected algorithm, of B and a quotient of A divided by B;

determining, by the one or more computer processors, a second difference between the product from A; and providing, by the one or more computer processors, the second difference as an output.

2. The computer implemented method according to claim 1, wherein determining the difference between A and B comprises:

determining, by the one or more computer processors, a difference between a number of leading zeros for B minus a number of leading zeros for A.

3. The computer implemented method according to claim 1, wherein the threshold is four.

4. The computer implemented method according to claim 1, wherein the digit wise multiplication algorithm comprises digit wise multiplication and continuous summing of partial products.

5. A computer program product for dynamic selection of a multiplication algorithm, the computer program product comprising one or more computer readable storage devices and collectively stored program instructions on the one or more computer readable storage devices, that when executed cause a processor to:

receive operands A and B;

determine a difference between A and B;

estimate a number of quotient digits according to the difference between A and B;

select a digit wise multiplication algorithm if the difference falls below a threshold;

select a multi-digit multiplication algorithm if the difference equals or exceeds the threshold;

determine a product using the selected algorithm, of B and a quotient of A divided by B;

determine a second difference between A and the product; and providing the second difference as an output.

6. The computer program product according to claim 5, wherein determining the difference between A and B comprises:

determining a difference between a number of leading zeros for B minus a number of leading zeros for A.

7. The computer program product according to claim 5, wherein the threshold is four.

8. The computer program product according to claim 5, wherein the digit wise multiplication algorithm comprises digit wise multiplication and continuous summing of partial products.

9. A computer system for dynamic selection of a multiplication algorithm, the computer system comprising:

one or more computer processors;

one or more computer readable storage devices; and stored program instructions on the one or more computer readable storage devices, which when executed cause the one or more computer processors to:

receive operands A and B;

determine a difference between A and B;

estimate a number of quotient digits according to the difference between A and B;

select a digit wise multiplication algorithm if the difference falls below a threshold;

select a multi-digit multiplication algorithm if the difference equals or exceeds the threshold;

determine a product using the selected algorithm, of B and a quotient of A divided by B;

determine a second difference between A and the product; and providing the second difference as an output.

10. The computer system according to claim 9, wherein determining the difference between A and B comprises:

determining a difference between a number of leading zeros for B minus a number of leading zeros for A.

11. The computer system according to claim 9, wherein the threshold is four.

12. The computer system according to claim 9, wherein the digit wise multiplication algorithm comprises digit wise multiplication and continuous summing of partial products.

13. A computer implemented method for dynamic selection of a multiplication algorithm comprising:

receiving operands A and B;

determining a difference between A and B;

estimating a number of quotient digits according to the difference between A and B;

selecting a digit wise multiplication algorithm if the estimated number of quotient digits falls below a threshold;

selecting a multi-digit multiplication algorithm if the estimated number of quotient digits equals or exceeds the threshold;

determining a product, by the one or more computer processors using the selected algorithm, of B and a quotient of A divided by B;

determining, by the one or more computer processors, a second difference between the product from A; and providing, by the one or more computer processors, the second difference as an output.

14. The computer implemented method according to claim 13, wherein determining the difference between A and B comprises:

determining a difference between a number of leading zeros for B minus a number of leading zeros for A.

15. The computer implemented method according to claim 13, wherein the digit wise multiplication algorithm comprises digit wise multiplication and continuous summing of partial products.

16. A computer implemented method for dynamic selection of a multiplication algorithm comprising:

receiving operands A and B;

determining a difference between A and B;

selecting a digit wise multiplication algorithm if the difference falls below a threshold;

selecting a multi-digit multiplication algorithm if the difference equals or exceeds the threshold;. pre-scaling the operands;

calculating a quotient for the operands;

back multiplying the quotient and operand B, using the selected algorithm, yielding a product;

subtracting the product from operand A, yielding a remainder; and providing the remainder as an output.

17. The computer implemented method according to claim 16, wherein determining the difference between A and B comprises:

determining a difference between a number of leading zeros for B minus a number of leading zeros for A.

18. The computer implemented method according to claim 16, wherein the threshold is four.

* * * * *